United States Patent [19]

Petlak et al.

[11]  4,286,943
[45]  Sep. 1, 1981

[54] AIR HEATER

[75] Inventors: Joseph J. Petlak, 3 Lincoln Dr., Wallingford, Conn. 06492; Joseph M. Salafia, Middletown, Conn.

[73] Assignee: Joseph J. Petlak, Wallingford, Conn.

[21] Appl. No.: 68,417

[22] Filed: Aug. 21, 1979

[51] Int. Cl.³ .......................................... F23D 15/02
[52] U.S. Cl. .............................. 431/352; 126/110 C; 432/222
[58] Field of Search ...................... 60/39.65; 432/222; 431/351, 352, 353, 9, 71, 90; 126/110 C

[56]  References Cited

U.S. PATENT DOCUMENTS

| 1,650,342 | 11/1927 | Good | 431/352 |
| 2,510,645 | 6/1950 | McMahan | 432/222 |
| 2,606,014 | 8/1952 | Baumann | 432/222 |
| 3,229,748 | 1/1966 | Spielmann | 431/352 |
| 4,203,720 | 5/1980 | Chaffee et al. | 432/222 |

FOREIGN PATENT DOCUMENTS 1033539  7/1953  France ..................................... 431/352

Primary Examiner—James C. Yeung

[57]  ABSTRACT

Air heater having an outer manifold and an inner combustion chamber with a common longitudinal axis, and a burner in the rear end of the chamber, of which the manifold has an air inlet in its rear end and a constricted air outlet in its front end, and the combustion chamber has in its peripheral wall a plurality of ports through which to divert part of the air from the manifold into the chamber for its heat-up by the burner flame therein and discharge through the open end of the chamber.

1 Claim, 7 Drawing Figures

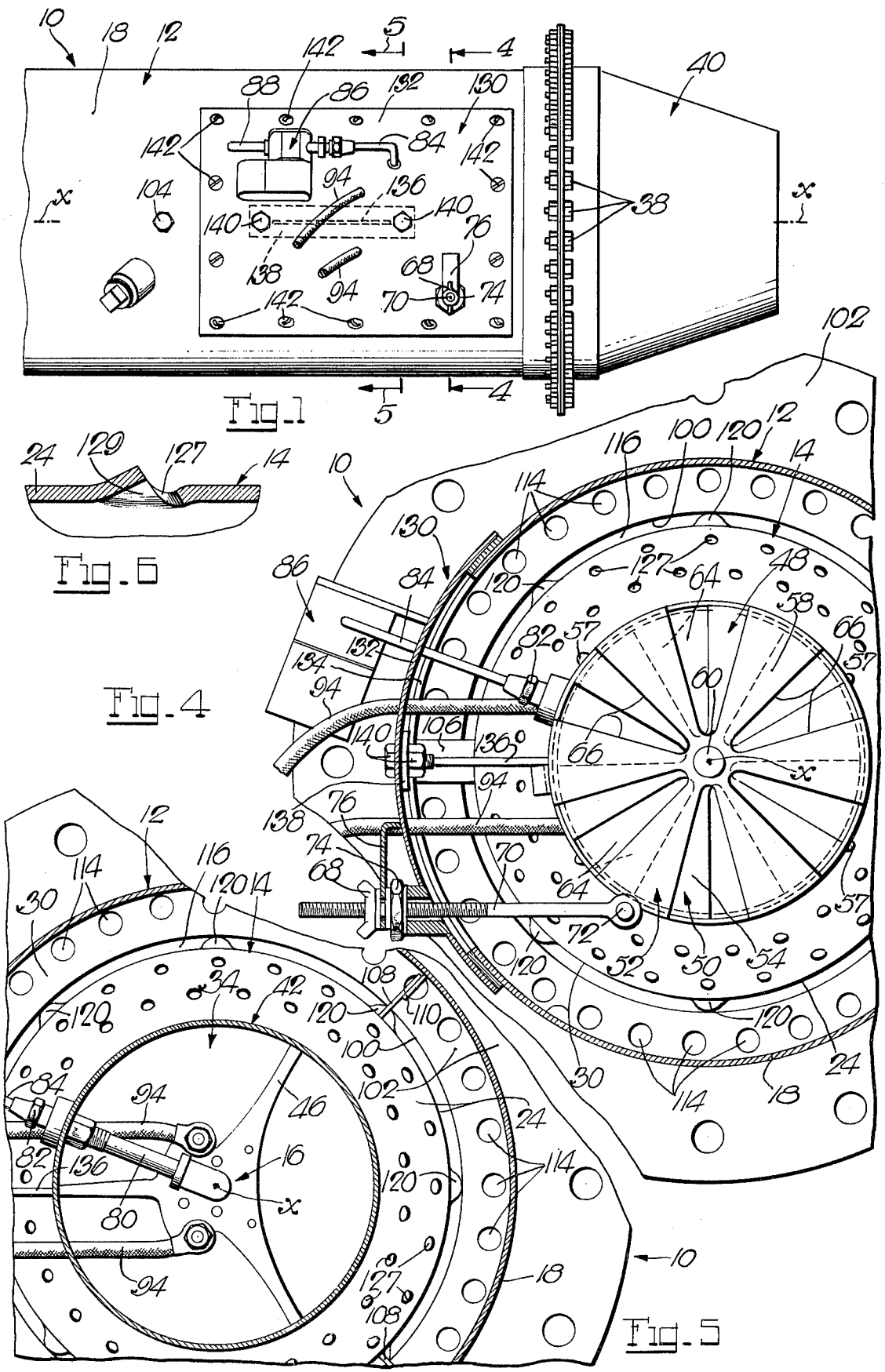

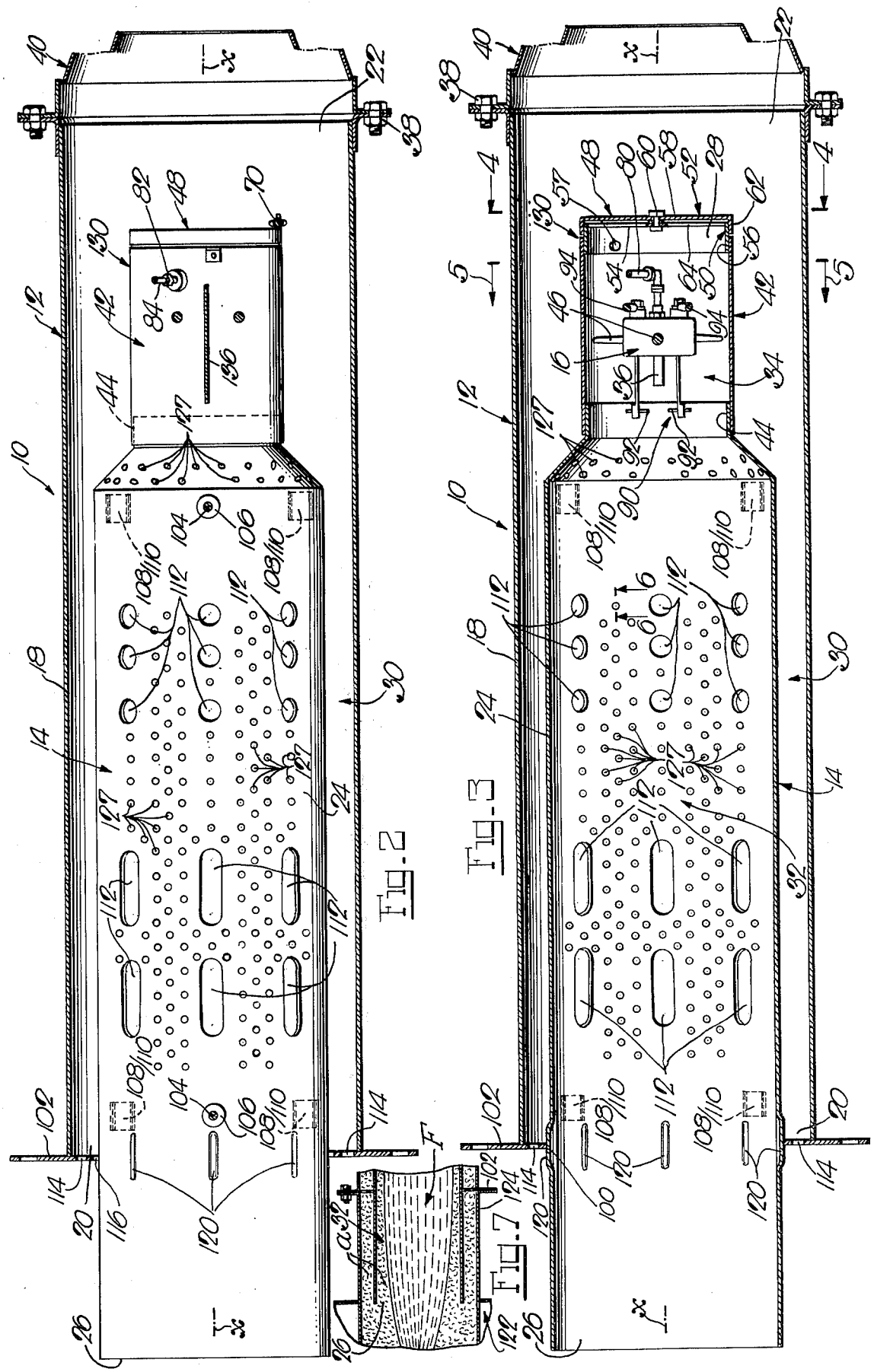

AIR HEATER

This invention relates to air heaters in general, and to air jet heaters in particular.

The invention is concerned with air heaters for use especially, though not exclusively, in heavy-duty snow disposal equipment in which snow and also ice by the tons may steadily be dumped into waste water from previously melted snow or ice in a large tank and be as steadily melted therein on discharging hot gases from a suitable heater into such waste water for heating as well as agitating the same. To thus melt large amounts of snow and ice at the efficient rate required of equipment of this type, the heaters must put out large volumes of extremely hot gases at high rates comparable to the gases discharged from aircraft jet engines. In fact, while different types of air heaters are used in equipment of this type, those fashioned from aircraft jet engines by simple conversion are preferred due to their compact construction, but primarily due to their characteristic blast of extremely hot gases which is particularly effective in heating and agitating waste water for rapid snow and ice melting therein. However, even though such aircraft jet engines are usually from surplus stock, their cost is nevertheless disproportionately high in comparison to the cost of the rest of such snow disposal equipment, but even far more important, the conversion of aircraft jet engines into heaters for snow and ice melting purposes becomes virtually untenable because the available surplus stock of aircraft jet engines affords no ready supply source for replacement parts at a reasonable cost which would be imperative for adequate servicing of such converted heaters.

It is a primary object of the present invention to provide an air heater of a type of which the output of gases is in point of their high temperature and blast intensity comparable to the characteristic blast of extremely hot gases from an aircraft jet engine, yet is of incomparably simpler construction and correspondingly lower cost than a jet engine and, moreover, is at least as compact as such an engine. To these ends, the heater is the product of a new design from beginning to end which affords much freedom in choosing its construction, not only with a view toward attaining the featured output of hot gases of blast intensity, but also with a view toward attaining the greatest simplicity of the construction for both, its lowest initial cost as well as for its ready servicing at reasonable cost.

It is another object of the present invention to provide an air heater of this type which in its aforementioned design for attainment of the featured gas output and also featured structural simplicity and compactness, relies merely on two cylindrical bodies and a simple burner for the basic structure of the heater, of which one body holds the burner and serves as a combustion chamber for the same, and the other body surrounds and is concentric with the inner body and serves as a manifold which during operation of the heater is constantly supplied with air from a high-power blower, while mere configuration of the air manifold and combustion chamber, largely by simple ports in the cylindrical bodies, is mostly relied on for flashing the air supplied to the manifold to the required high temperature by the burner flame and discharging this hot air and the flame's products of combustion from the heater at the required blast intensity. Thus, the large air mass constantly supplied by the blower to the manifold is directed into the open rear end of the latter, and the burner is located in the rear end of the combustion chamber next to the rear end of the manifold but is well shielded from the on-rushing air thereat by an adjustable shutter mechanism which admits into the rear end of this chamber air which is sufficient for sustaining combustion of the fuel constantly discharged from the burner nozzle, but is insufficient to extinguish the burner flame at its base next to the burner nozzle, while the ports are arranged in two sets, of which the ports of one set are provided in the peripheral wall of the combustion chamber to divert air from the manifold into this chamber at or near the maximum permissible volumetric flow rate at which this air will still sustain, rather than extinguish, the burner flame and will have optimum dwell in the driving flame and be flashed thereby to its peak temperature, and the ports of the other set are provided in the front end of the manifold for the discharge thereat at peak velocity of the remaining admitted air which on its pass through the manifold in effective heat exchange with the hot combustion chamber therein has also reached a fairly high temperature. Thus, the gases discharged from the open front end of the combustion chamber are at peak temperature but below peak blasting velocity, and the gases discharged from the ports in the air manifold are at peak blasting velocity but below peak temperature, wherefore the gases discharged from the open front of the combustion chamber are more effective in heating, and the gases discharged from the ports in the air manifold are more effective in agitating, waste water from previously melted snow and ice for rapidly melting newly dumped snow and ice therein.

It is a further object of the present invention to provide an air heater of this type in which the volumetric flow rate of the air diverted from the manifold into the combustion chamber and the distribution of this air over the longitudinal extent of this chamber, as well as the discharge velocity of the remaining air from the ports in the manifold, are readily controlled by the exceedingly simple expediency of selective location and size of the ports of both of the aforementioned sets. Thus, the ports in the combustion chamber are readily sized for attaining a desired volumetric flow rate of diverted air into the combustion chamber, and these ports are fairly distributed over the longitudinal extent of this chamber as a first step toward like distribution of the diverted air therein, and the provision of the air discharge ports in the manifold locationwise at the front end thereof largely suppresses adverse random turbulence of the admitted air in this manifold under the prevailing back pressure therein and constant delivery thereinto of additional air by the blower and, instead, sets this air into some orderly general motion directionwise toward these discharge ports and, hence, along the ports in the combustion chamber with ensuing diversion of air into this chamber fairly evenly through the ports therein, while the ports in the front end of the manifold are on the one hand sufficiently numerous to discharge the large volume of the remaining air passing through the manifold at any instant, but on the other hand are individually quite constricted so that the air passing through them reaches a very high peak velocity.

Another object of the present invention is to provide an air heater of this type in which the burner flame is maintained at a sufficiently large size for its reach to, and preferably even somewhat beyond, the front end of the combustion chamber, and for its spread into fairly close proximity to the peripheral wall of this chamber, whereby the flame has a highly desirable maximum heating effect on the air supplied to the heater.

A further object of the present invention is to provide an air heater of this type in which the burner flame is maintained at the aforementioned large size for its advantageous maximum heating effect on the air supplied to the heater without, however, giving rise to the usual hard carbon deposits from the flame on the peripheral wall of the combustion chamber which, if tolerated, would quickly accumulate to a prohibitively thick layer and soon call for costly removal. To the end of avoiding such hard carbon deposits from the flame in the combustion chamber, the peripheral wall of the latter is provided, in addition to the aforementioned air ports therein, with apertures of which there is a great multitude for their fairly close distribution over most of this chamber wall that is closest to the burner flame, and which are of very small size for admitting therethrough air from the manifold into the combustion chamber in the form of jets of very high velocity, with these apertures being further provided in scoop-like formations for directing the high-velocity air jets therefrom against the nearby inner peripheral wall surface of the combustion chamber and thus constantly blow away any carbon dust from the flame before it has a chance to settle on this wall surface.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary side view of an air heater embodying the invention;

FIG. 2 is a longitudinal section through the air heater;

FIG. 3 is another longitudinal section through the air heater;

FIGS. 4 and 5 are fragmentary sections through the air heater taken substantially on the lines 4—4 and 5—5, respectively, of FIG. 3;

FIG. 6 is an enlarged section through the air heater taken along the line 6—6 of FIG. 3; and FIG. 7 is a fragmentary section through the air heater in operation.

Referring to the drawings, the reference numeral 10 designates an air heater which has as its major components two tubular, and in this instance cylindrical, bodies or casings 12 and 14, and a burner assembly 16. The casings 12 and 14, which are preferably fabricated from sheet metal stock, have a common longitudinal axis x, with the casing 14 extending in the casing 12 at least over the greater part of the length of the latter and being concentric therewith (FIGS. 2 to 5). The outer casing 12 has a peripheral wall 18 and open front and rear ends 20 and 22, and the inner casing 14 has a peripheral wall 24 and open front and rear ends 26 and 28, with the peripheral walls 18 and 24 of the casings being spaced from each other to form therebetween an air manifold 30 (FIGS. 2 and 3), and the inner casing 14 serving as a combustion chamber 32 with an igniter section 34 for the burner assembly 16. Suitably mounted at 38 on the outer casing 12 at its rear end 22 is an inlet cone 40 (FIGS. 1 to 3) through which to admit air from a heavy-duty blower (not shown) into the manifold 30. The igniter section 34 of the combustion chamber 32 is formed by a diametrically reduced endlength of the inner casing 14 which in this instance is formed by a separate cylindrical sleeve 42 that is removably mounted on an end rim formation 44 on the inner casing (FIG. 3). The burner assembly 16 is by a suitable spider formation 46 located in the igniter section 34 of the combustion chamber 32 so as to extend with its burner tube 36 coaxially with the igniter section 34. Received in the open rear end 28 of the igniter section 34 of the combustion chamber 32 is a shutter mechanism 48 having stationary and movable companion sections 50 and 52 (FIGS. 3 and 4), of which the stationary section 50 provides an annular disc 54 with a peripheral rim 56 which is received in the igniter section 34 and secured thereto as by rivets 57, for example, and the movable section 52 also provides an annular disc 58 which is turnable on a center in 60 on the disc 54 of the stationary section 50, with this movable section 52 further having a peripheral rim 62 which rides on the rim 56 of the stationary shutter section 50 (FIG. 3). The disc formations 54 and 58 of the stationary and movable shutter sections 50 and 52 are provided with apertures 64 and 66 through which to admit combustion air from the rear end 22 of the outer casing 12 into the igniter section 34 of the combustion chamber 32, with the volume of combustion air per time unit thus admitted into the igniter section 34 depending on the degree of register between the apertures 64 and 66 in the shutter sections 50 and 52, and being regulatable by angularly adjusting the movable shutter section 52 relative to the stationary shutter section 50. The shutter section 52 is thus adjustable on turning a wing nut 68 on a threaded rod 70 which at 72 has a pivot connection with this shutter section (FIG. 4), with the wing nut 68 being on adjustment of the shutter section 52 locked by a nut 74 to a bracket 76 on the outer casing 12 (FIGS. 1 and 4).

The burner tube 36 of the assembly 16 is supplied with fuel, in this instance oil, through a pipe 80 which by a union 82 and continuing pipe 84 is connected with the output side of a motor-operated fuel pump 86 that has its input side connected with a fuel supply pipe 88 (FIGS. 1 to 5). There is also provided a spark ignition unit 90 for igniting the fuel discharged from the burner tube 36, with this unit including spark electrodes 92 carried by the burner assembly 16 and cables 94 for supplying the electrodes 92 with operating current.

The inner casing 14 is held in the outer casing 12 by being received in an annular opening 100 in an endplate 102 which is welded or otherwise secured to the front end 20 of this outer casing (FIGS. 2 to 5), and by being further secured to the outer casing 12 by plural, in this instance two, bolts 104 which are received in lateral spacer projections 106 on the inner casing (FIGS. 1, 2 and 4), with the inner casing 14 being also held in correct angular disposition in the outer casing 12 by the bolts 104 and additionally by outer radial plates 108 on the inner casing 14 which rest on inner radial plates 110 on the outer casing 12 (FIGS. 2, 3 and 5). The bolts 104 also lock the inner casing 14 to the outer casing 12 in correct longitudinal disposition relative to each other in which the open front end 26 of the inner casing 14 extends outwardly beyond the front end 20 of the outer casing 12 (FIGS. 2 and 3).

With the inlet cone 40, and hence also the manifold 30, being adapted to receive the output of a heavy duty blower, and with the shutter mechanism 48 admitting combustion air to the igniter section 34 of the combustion chamber 32, provisions are also made to admit at any instant a large volume of air from the manifold 30 into the combustion chamber 32 therein to comingle with the flame from the burner tube 26 and, in consequence, be flashed thereby to very high peak, temperatures. To the latter end, the peripheral wall 24 of the inner casing 14 is provided with a plurality of ports or apertures 112 which are fairly distributed over a major part of the combustion chamber 32.

For reasons explained hereinafter, part of the air which is constantly supplied to the manifold 30 by the blower is also permitted to escape from the manifold at its front end, and in this instance through suitable ports in the endplate 102. All but one of these ports are in the form of apertures 114 which are equi-angularly spaced in the endplate 102, and the one additional port is formed by a gap 116 between the peripheral wall 24 of the inner casing 14 and the annular opening 100 in the endplate 102 (FIGS. 2, 4 and 5). The individual apertures 114 are fairly constricted in comparison to the apertures 112 in the inner casing wall 24 so that the air escapes through the apertures 114 in the form of jets of velocities which are quite high and in any event higher than the velocities of the air streams passing through the far less constricted apertures 112 in the inner casing wall 24. However, while the apertures 114 are individually fairly constricted, they are also quite numerous so that a fairly substantial total volume of air will escape through these apertures 114 at any instant. An additional volume of air will also escape from the manifold 30 through the described end gap 116 which is annular except for a few local interruptions where the endplate 102 rests with its annular opening 100 on a plurality of raised bead formations 120 in the inner casing wall 24 (FIGS. 2 to 5). The end gap 116 in the manifold 30 is widthwise quite constricted so that the air escaping therethrough has a fairly high velocity the same as the air jets escaping through the end apertures 114.

With the air being supplied by the blower to the manifold 30 preferably at a rather high volumetric flow rate, the air in the manifold is under a constant back pressure which at any instant displaces a fairly large volume of this air through the apertures 112 into comingling relation with the burner flame in the combustion chamber 32, with the result that the gases, i.e., air and the flame's products of combustion, which are constantly blasted from the open front end 26 of the combustion chamber, are extremely hot. On the other hand, while the volume of air displaced at any instant from the manifold 30 into the combustion chamber 32 through the apertures 112 is advantageously quite large, this volume of air must nevertheless be kept within bounds so that it will not extinguish the burner flame but, instead, have optimum dwell in this flame. This is in keeping with the requirement that the hot gases blasted from the front end of the combustion chamber 32 must be primarily effective in heating waste water from previously melted snow and ice as one of the explained keys toward attaining rapid snow and ice melting. Conversely, and in keeping with the requirement that the air blasted from the front end of the manifold 32 must be primarily effective in rather violently agitating waste water from previously melted snow and ice as the other explained key toward attaining rapid snow and ice melting, the apertures 114 and gap 116 in the front end of the manifold 30 are arranged for escape therethrough of air at peak velocities. Of course, the air thus blasted from the manifold 32 at its front end is also fairly hot owing to its pass through the heat zone maintained in the manifold by the driving flame in the combustion chamber, wherefore this heated air also contributes toward effective heating of waste water from previously melted snow and ice for rapid melting of additional snow and ice. The air permitted to escape from the manifold 30 at its front end, while primarily functioning to attain fairly violent agitation of waste water from previously melted snow and ice, is also instrumental in achieving displacement of air from the manifold 30 into the combustion chamber 32 fairly evenly through the well distributed apertures 112 in the inner casing wall 24, which makes for admission at any instant of air of uniform volume and least turbulence from the manifold into the combustion chamber and also for optimum dwell of this air in the burner flame. Thus, the air escaping at any instant from the front end of the manifold 30 keeps the large volume of air in the latter in some orderly general motion directionwise toward the front end of the manifold which largely suppresses random turbulence of this air under the prevailing back pressure and constant forced delivery of additional air by the blower, with ensuing displacement of air into the combustion chamber through the apertures 112 in the aforementioned even manner. It also follows from the preceding that the volumetric flow rate of the air diverted from the manifold 30 into the combustion chamber 32 and the distribution of this air in this chamber, as well as the volume and velocity of the air discharged at any instant from the manifold through the front end thereof, are readily controlled by the exceedingly simple expediency of selective location and size of the apertures in the inner casing wall 24 and in the front end of the manifold 30.

The igniter section 34 of the combustion chamber 32 is closed to the forced air stream from the blower except at the registering apertures 64 and 66 in the sections 50 and 52 of the shutter mechanism 48 (FIGS. 3 and 4). However, while the operational register of the apertures 64 and 66 in the shutter mechanism is fairly constricted with ensuing fairly high velocity of the air passing therethrough and into the igniter section 34, the latter acts as an expansion chamber in which the velocity of the admitted air drops quickly way below a velocity at which this air would extinguish the burner flame at its critical base next to the burner tube 36. Also, with the igniter section 34 being in the path of the forced stream of atmospheric air from the blower, this air keeps the ignition section sufficiently cool to prevent any deterioration of the electric cables 94 for the ignition electrodes 92 from any heat cause.

For operation of the present heater 10 in heavy-duty snow disposal equipment, the heater is operatively connected with a tank 122 of such equipment (FIG. 7) through intermediation of an output duct 124 which in this instance is bolted to the endplate 102 and extends into waste water in the tank 122, with this output duct 122 discharging the gases from the heater, i.e., hot air a and the products of combustion from the flame F, into such waste water.

In operation of the heater, the driving burner flame in the combustion chamber 32 establishes not only a zone of extreme heat intensity in this chamber, but also another zone of less, though still high, heat intensity in the manifold 30 in which the passing air is effectively heated. However, the manifold 30 is at any instant supplied with atmospheric air of such large volume that the same insulates the peripheral wall of the outer casing from the contained heat sufficiently to require neither protective shielding nor external cooling of this wall.

For optimum air heating capacity of the present heater, optimum length and also width is a preferred characteristic of the burner flame. Thus, the flame from the burner tube 36 extends to, and preferably even somewhat beyond, the front end 26 of the combustion chamber 32 (FIG. 7), and the same extends widthwise into such close proximity to the inner casing wall as heavily to subject the latter to carbon deposits from the flame. In order to avoid such carbon deposits, the inner casing wall 24 is provided, at least over the longitudinal region in which the flame comes closest to it, with a multitude of apertures 127 which individually are quite constricted so that the air jets passing therethrough and into the combustion chamber reach velocities that are sufficiently high to blow all carbon particles from the flame away from the inner casing wall and thus keep the same clean. The apertures 127 are advantageously formed in scoop-like depressions 129 in the casing wall 24 so that the axes of these apertures are inclined to the heater axis x and point toward the front end of the combustion chamber 32 for optimum sweeping effect of the air jets on the inner casing wall (FIG. 6).

The present heater is of exceeding structural simplicity, and is also quite compact. Thus, the structural simplicity of the heater stems from its basic structure of but three simple major components, i.e., two cylindrical body parts 12 and 14 and a simple burner assembly 16. Further, and as is self-evident from the preceding description, the assembly of these parts into the basic heater structure is quite simple and requires hardly any skill. The present heater is also designed with a view toward ready servicing, including repairing, the same. Thus, the igniter section 34 and its shutter mechanism, together with the contained burner assembly 16 and spark ignition unit 90, these being prominent operating components of the heater, are preferably assembled in a separate unit 130 which is readily accessible and as readily removable from the heater for quick repair or replacement of any of these operating components or for any other purpose. This unit provides, besides the operating components just mentioned, a cover plate 132 for a side opening 134 in the outer casing wall 18 (FIGS. 1 and 4) and a plate 136 which ties the igniter section 34 and therein contained operating components to the cover plate 132. Thus, the igniter section 34 forms part of the unit 130 because it is formed by the cylindrical sleeve 42 that is axially removable from the inner casing 14 (FIGS. 2 and 3) and carries the burner assembly 16 with the spark ignition unit 90, and also the shutter mechanism 48. The tie plate 136 may be welded or otherwise secured to the cylindrical sleeve 42 and extends radially therefrom, and is provided at its outer end with a flange 138 which at 140 is bolted to the cover plate 132. Thus, with the cover plate 132 held closed on the side opening 134 in the outer casing wall 18 by screws 142 (FIGS. 1 and 4), the igniter section 34 in the form of the separate cylindrical sleeve 42 is carried, and held in place on the end rim 44 on the inner casing 14, by the closed cover plate 132 through intermediation of the tie plate 136, with the cover plate 132 also carrying the fuel pump 86 and the bracket 76 against which the wing nut 68 and lock nut 74 on the shutter-adjusting rod 70 are tightened. If for any reason whatever, such as repair or replacement of any of the operating components of the unit 130, it becomes advisable to remove this unit from the heater, it is merely necessary to unscrew the cover plate 132 from the outer casing wall 18 and shift the released cover plate just sufficiently toward the rear of the heater to retract the igniter sleeve 42 from the end rim on the inner casing 14, whereupon the unit 130 is free for removal from the heater, with the sleeve and its operating components being passed through the side opening 134 in the outer casing wall 18. If desired, the cover plate 132 of the unit 130 may also be removed from the outer casing wall and from the part of the unit formed by the igniter sleeve 42 and operating components therein before this latter part of the unit is removed through the side opening in the outer casing wall. After making the necessary repair or replacement, the unit 130 may as readily be reassembled with the heater.

What is claimed is:

1. An air heater, providing two tubular bodies with a common axis, each having a cylindrical wall and open front and rear ends, of which one body extends in the other body and projects from the front end of the latter and said one body has its rear end formed as a compartment with an opening to said rear end of said other body, with the cylindrical wall of said one body being spaced inwardly from that of said other body to form a manifold therebetween, an oil burner located in said compartment, ports in said cylindrical wall of said one body distributed over the expanse of said manifold, an air blower having its output side connected with the open rear end of said other body to direct an air stream into said manifold, an adjustable shutter mechanism in said opening of said compartment for diverting combustion air from said stream into said compartment, a ring member closing said manifold at said open front end of said other body and provided with a multitude of apertures spaced about said ring member, a substantially continuous gap form between said ring member and the wall of said one body, with the velocity of said air stream being sufficiently high for keeping said manifold under permissible temperature control on setting the burner flame for maximum heat output and maximum spread substantially throughout the interior of said one body.

* * * * *